(12) United States Patent
Stefan et al.

(10) Patent No.: US 10,380,711 B2
(45) Date of Patent: Aug. 13, 2019

(54) SYSTEM AND METHOD FOR RIDESHARE VEHICLE CHAINING

(71) Applicant: GM GLOBAL TECHNOLOGY OPERATIONS LLC, Detroit, MI (US)

(72) Inventors: Jeffrey Stefan, Clawson, MI (US); Christopher Devries, Ann Arbor, MI (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 273 days.

(21) Appl. No.: 15/611,163

(22) Filed: Jun. 1, 2017

(65) Prior Publication Data

US 2018/0350022 A1    Dec. 6, 2018

(51) Int. Cl.

| | |
|---|---|
| *G06Q 50/00* | (2012.01) |
| *G06Q 50/30* | (2012.01) |
| *G06Q 10/02* | (2012.01) |
| *G01C 21/34* | (2006.01) |
| *G08G 1/00* | (2006.01) |

(52) U.S. Cl.
CPC ......... *G06Q 50/30* (2013.01); *G01C 21/3438* (2013.01); *G06Q 10/02* (2013.01); *G08G 1/202* (2013.01)

(58) Field of Classification Search
CPC ..... G06Q 50/30; G06Q 10/02; G01C 21/3438
USPC ...................................................... 705/5, 16
See application file for complete search history.

(56) References Cited

U.S. PATENT DOCUMENTS

| | | | |
|---|---|---|---|
| 2002/0188492 A1* | 12/2002 | Borton | G06Q 10/06 705/7.13 |
| 2006/0223518 A1* | 10/2006 | Haney | H04W 4/21 455/420 |
| 2008/0275643 A1* | 11/2008 | Yaqub | G01C 21/343 701/412 |

* cited by examiner

*Primary Examiner* — Rokib Masud

(57) ABSTRACT

A system to provide instructions to establish a vehicle chain is presented herein. The system includes a memory, controller, and plurality of fleet vehicles. The controller moreover outputs these instructions to at least two vehicles to cause the vehicles to command themselves to establish a vehicle chain to complete a rideshare reservation. As such, a first vehicle may traverse from its vehicle location to a user location and thereafter to a rallying location. Conversely a second vehicle may traverse from its vehicle location to the rallying location and thereafter to a destination location. The controller may output these instructions upon a determination that the vehicles have depleted vehicle resources.

20 Claims, 6 Drawing Sheets

SYSTEM AND METHOD FOR RIDESHARE VEHICLE CHAINING

INTRODUCTION

Fleet management systems employed for personal transportation services can deploy vehicles made available for reservation. As such, when the system has delegated and deployed a vehicle, it will automatically traverse itself over to the customer location for pickup. Thereafter, the vehicle will transport/shuttle the customer to their desired destination and drop the customer off, before repositioning itself for parking or refueling/recharging. Nonetheless, these services can deplete significant vehicle resources, and make it impracticable for the vehicle to carry out their reservation. Accordingly, it is desirable to provide a system and method to instruct deployed fleet vehicles to perform reservation tasks in a manner that effectively reduces the issues associated with vehicle resource depletion.

SUMMARY

A system to provide instructions to establish a vehicle chain is presented herein. The system includes a memory, controller, and plurality of fleet vehicles. The memory is configured to include one or more executable instructions. The controller is configured to execute the executable instructions, the controller is further configured to receive user location data and destination location data communicated from a mobile computing device. The mobile computing device is configured to generate user location data and destination location data, the mobile computing device is further configured to communicate both the user location data and destination location data to the controller. Each of the fleet vehicles are configured to communicate with the controller and each of which has a first vehicle system, second vehicle system, and vehicle controls device. The first vehicle system is configured to generate vehicle location data, wherein the second vehicle system is configured to generate system function data, and wherein the vehicle controls device is configured to command the fleet vehicle to autonomously complete one or more rideshare reservations. Moreover, wherein the executable instructions enable the controller to: receive the user location data communicated from the mobile computing device; receive the destination location data communicated from the mobile computing device; receive the respective vehicle location data communicated from each fleet vehicle of the plurality of fleet vehicles; receive the respective system function data communicated from each fleet vehicle of the plurality of fleet vehicles; select at least two fleet vehicles from the plurality of fleet vehicles, wherein each selection is based, at least in part, on the vehicle location data and system function data of the respective fleet vehicle in relation to the user location data (wherein the at least two selected fleet vehicles are considered a first-selected vehicle and a second-selected vehicle); produce first output data configured to instruct the vehicle controls device of the first-selected vehicle to command the first-selected vehicle to traverse from a vehicle location which corresponds to the respective vehicle location data to a user location which corresponds to the user location data, the first output is further configured to command the first-selected vehicle to subsequently traverse from the user location to a rallying location; produce second output data configured to instruct the vehicle controls device of the second-selected vehicle to command the second-selected vehicle to traverse from a vehicle location which corresponds to the respective vehicle location data to the rallying location, the second output is further configured to command the second-selected vehicle to subsequently traverse from the rallying location to a destination location which corresponds to the destination location data; communicate the first output data to the first-selected vehicle; and communicate the second output data to the second-selected vehicle.

The executable instructions may further enable the controller to select the rallying location based, at least in part, on the respective vehicle location data and respective system function data of the at least two selected fleet vehicles. In one or more embodiments, each fleet vehicle in the plurality of fleet vehicles may include a propulsion system having at least one electric motor operatively connected to each of the vehicle wheels. In these embodiments, the second vehicle system is an on-board diagnostic feature and the system function data includes State of Charge information. In one or more embodiments, each fleet vehicle in the plurality of fleet vehicles may include a propulsion system having at least one internal combustion engine. In these embodiments, the second vehicle system is a fuel gauge and the system function data includes fuel-level information. The mobile computing device may be further configured to generate time parameter data and may also be further configured to communicate the time parameter data to the controller, and wherein the selection of the at least two fleet vehicles from the plurality of fleet vehicles is further based, at least in part, on the time parameter data.

A method to provide instructions to establish a vehicle chain is also presented herein. The method includes the steps of: providing a memory configured to comprise one or more executable instructions; providing a controller configured to execute the executable instructions, the controller being further configured to receive user location data and destination location data communicated from a mobile computing device; providing a mobile computing device configured to generate both user location data and destination location data, the mobile computing device is further configured to communicate the user location data and destination location data to the controller; providing a plurality of fleet vehicles each of which is configured to communicate with the controller and each of which comprises a first vehicle system, a second vehicle system, and a vehicle controls device, wherein the first vehicle system is configured to generate vehicle location data, wherein the second vehicle system is configured to generate system function data, and wherein the vehicle controls device is configured to command the fleet vehicle to autonomously complete one or more rideshare reservations; receiving (via the controller) the user location data communicated from the mobile computing device; receiving (via the controller) the destination location data communicated from the mobile computing device; receiving (via the controller) the respective vehicle location data communicated from each fleet vehicle of the plurality of fleet vehicles; receiving (via the controller) the respective system function data communicated from each fleet vehicle of the plurality of fleet vehicles; selecting (via the controller) at least two fleet vehicles from the plurality of fleet vehicles, wherein each selection is based, at least in part, on the vehicle location data and system function data of the respective fleet vehicle in relation to the user location data, wherein the at least two selected fleet vehicles are considered a first-selected vehicle and a second-selected vehicle; producing (via the controller) first output data configured to instruct the vehicle controls device of the first-selected vehicle to command the first-selected vehicle to traverse from a vehicle location which corresponds to the respective vehicle location data to a user location which corresponds to the user location data, the first output is further configured to command the first-selected vehicle to subsequently traverse from the user location to a rallying location; producing (via the controller) second output data configured to instruct the vehicle controls device of the second-selected vehicle to command the second-selected vehicle to traverse from a vehicle location which corresponds to the respective vehicle location data to the rallying location, the second output is further configured to command the second-selected vehicle to subsequently traverse from the rallying location to a destination location which corresponds to the destination location data; communicating (via the controller) the first output data to the first-selected vehicle; and communicating (via the controller) the second output data to the second-selected vehicle.

The method may further include the step of selecting (via the controller) the rallying location based, at least in part, on the respective vehicle location data and respective system function data of the at least two selected fleet vehicles. In one or more embodiments, each fleet vehicle in the plurality of fleet vehicles includes a propulsion system having at least one electric motor operatively connected to each of the vehicle wheels. In these embodiments, the second vehicle system is an on-board diagnostic feature and the system function data includes State of Charge information. In one or more embodiments, each fleet vehicle in the plurality of fleet vehicles includes a propulsion system having at least one internal combustion engine. In these embodiments, the second vehicle system is a fuel gauge and the system function data includes fuel-level information. The mobile computing device may be further configured to generate time parameter data and further configured to communicate the time parameter data to the controller; and thus the step of: selecting (via the controller) the at least two fleet vehicles from the plurality of fleet vehicles is further based, at least in part, on the time parameter data.

A non-transitory and machine-readable medium is further presented herein. The non-transitory and machine-readable medium having stored thereon executable instructions adapted to produce instruction sets for at least two fleet vehicles such that the at least two fleet vehicles establish a vehicle chain for the completion of a rideshare reservation, which when provided to a controller and executed thereby, causes the controller to: receive user location data communicated from a mobile computing device; receive destination location data communicated from the mobile computing device; receive respective vehicle location data communicated from each fleet vehicle of a plurality of fleet vehicles; receive respective system function data communicated from each fleet vehicle of the plurality of fleet vehicles; select at least two fleet vehicles from the plurality of fleet vehicles, wherein each selection is based, at least in part, on the vehicle location data and system function data of the respective fleet vehicle in relation to the user location data, wherein the at least two selected fleet vehicles are considered a first-selected vehicle and a second-selected vehicle; produce first output data configured to instruct the vehicle controls device of the first-selected vehicle to command the first-selected vehicle to traverse from a vehicle location which corresponds to the respective vehicle location data to a user location which corresponds to the user location data, the first output is further configured to command the first-selected vehicle to subsequently traverse from the user location to a rallying location; produce second output data configured to instruct the vehicle controls device of the second-selected vehicle to command the second-selected vehicle to traverse from a vehicle location which corresponds to the respective vehicle location data to the rallying location, the second output is further configured to command the second-selected vehicle to subsequently traverse from the rallying location to a destination location which corresponds to the destination location data; communicate the first output data to the first-selected vehicle; and communicate the second output data to the second-selected vehicle. The non-transitory and machine-readable memory of claim may further include causing the controller to select the rallying location based, at least in part, on the respective vehicle location data and respective system function data of the at least two selected fleet vehicles.

In one or more embodiments, the non-transitory and machine-readable memory may further cause the controller to: receive time parameter data communicated from the mobile computing device, wherein selection of the at least two fleet vehicles from the plurality of fleet vehicles is further based, at least in part, on the time parameter data. In one or more embodiments, each fleet vehicle in the plurality of fleet vehicles includes a propulsion system having at least one electric motor operatively connected to each of the vehicle wheels. In these embodiments, the second vehicle system is an on-board diagnostic feature and the system function data comprises State of Charge information. In one or more embodiments, the second vehicle system is a fuel gauge and the system function data includes fuel-level information.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present system and/or method. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The following detailed description is merely exemplary in nature and is not intended to limit the application and uses. Furthermore, there is no intention to be bound by any expressed or implied theory presented in the preceding background and brief summary or the following detailed description. As used herein, the term module refers to an application specific integrated circuit (ASIC), an electronic circuit, a processor (shared, dedicated, or group) and memory that executes one or more software or firmware programs or code segments, a combinational logic circuit, and/or other suitable components that provide the described functionality.

Figure 1:
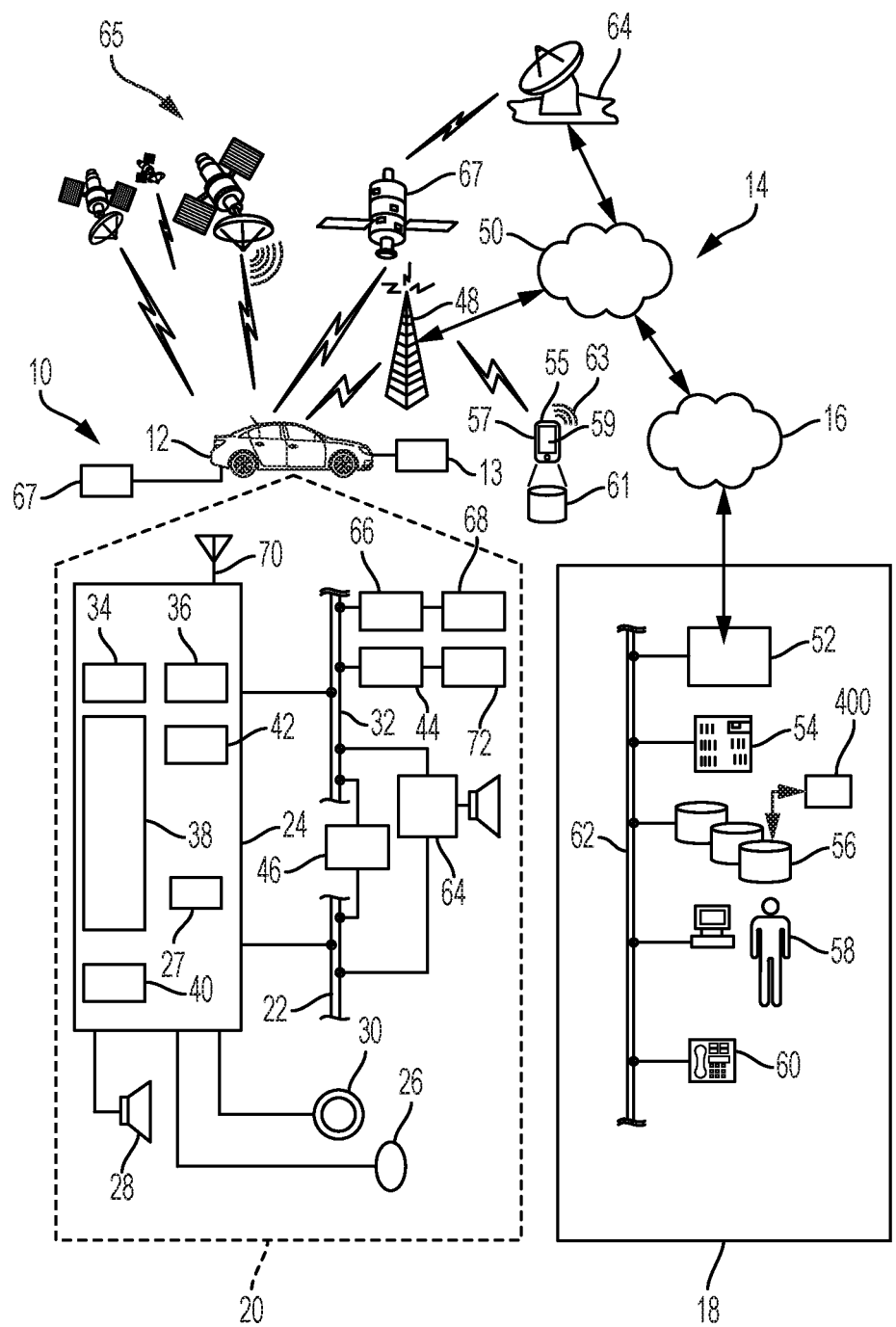
FIG. 1 is a block diagram depicting an exemplary embodiment of a communications system capable of utilizing the system and method disclosed herein.

As shown in FIG. 1, there is shown a non-limiting example of a communication system 10 that may be used together with examples of the system disclosed herein and/or to implement examples of the methods disclosed herein. Communication system 10 generally includes a fleet of vehicles 12 (shown as one), a wireless carrier system 14, a land network 16, and a data center 18 (i.e., the backend). It should be appreciated that the overall architecture, setup and operation, as well as the individual components of the illustrated system are merely exemplary and that differently configured communication systems may also be utilized to implement the examples of the system and/or method disclosed herein. Thus, the following paragraphs, which provide a brief overview of the illustrated communication system 10, are not intended to be limiting.

Each fleet vehicle 12 may be any type of user operated or autonomous vehicle (discussed below) such as a motorcycle, car, truck, bicycle, recreational vehicle (RV), boat, plane, etc., and is equipped with suitable hardware and software that enables it to communicate over communication system 10. Vehicle 12 may include a power train system with multiple generally known torque-generating devices including, for example, an engine 13. In certain embodiments, engine 13 can be an internal combustion engine that uses one or more cylinders to combust fuel, such as gasoline, in order to propel vehicle 12. In one or more alternative embodiments, however, the power train system can include numerous electric motors or traction motors that convert electrical energy into mechanical energy for propulsion of vehicle 12 (discussed below). Skilled artists will also see engine 13 can be a compression-ignition engine which uses a combustion chamber to combust fuel, such as diesel fuel, compressed natural gas, or propane.

Some of the fundamental vehicle hardware 20 for each fleet vehicle is shown generally in FIG. 1 including a telematics unit 24, a microphone 26, speaker 28, and buttons and/or controls 30 connected to telematics unit 24. Operatively coupled to telematics unit 24 is a network connection or vehicle bus 32. Examples of suitable network connections include a controller area network (CAN), a media oriented system transfer (MOST), a local interconnection network (LIN), an Ethernet, dedicated short-range communications channel (DSRC), and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is a communication system which provides a variety of services through its communications with the data center 18, and generally includes an electronic processing device 38, one or more types of electronic memory 40, a cellular chipset/component 34, wireless modem 36, dual mode antenna 70, and navigation unit containing a GPS chipset/component 42 capable of communicating vehicle location information via a GPS satellite system 65. GPS component 42 thus receives coordinate signals from a constellation of GPS satellites 65. From these signals, the GPS component 42 can determine vehicle position, which may be used for providing navigation and other position-related services to the vehicle operator. Navigation information can be presented on a display of telematics unit 24 (or other display within the vehicle) or can be presented verbally such as is done when supplying turn-by-turn navigation. The navigation services can be provided using a dedicated in-vehicle navigation module (which can be part of GPS component 42), or some or all navigation services can be done via telematics unit 24, wherein the location coordinate information (vehicle location data) is sent to a remote location for purposes of providing the vehicle with navigation maps, map annotations, route calculations, and the like.

The telematics unit 24 may provide various services including: turn-by-turn directions and other navigation-related services provided in conjunction with the GPS component 42; airbag deployment notification and other emergency or roadside assistance-related services provided in connection with various crash and/or collision sensor interface modules 66 and collision sensors 68 located throughout the vehicle and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services telematics unit 24 may be capable of offering. It is anticipated that telematics unit 24 may include a number of additional components in addition to and/or different components from those listed above.

Vehicle communications may use radio transmissions to establish a voice channel with wireless carrier system 14 so that both voice and data transmissions can be sent and received over the voice channel. Vehicle communications are enabled via the cellular component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc. To accomplish this effect, dual mode antenna 70 services the GPS component 42 and the cellular component 34.

Microphone 26 provides the driver or other vehicle occupant with a means for inputting verbal or other auditory commands, and can be equipped with an embedded voice processing unit utilizing a human/machine interface (HMI)

technology known in the art. Conversely, speaker 28 provides audible output to the vehicle occupants and can be either a stand-alone speaker specifically dedicated for use with the telematics unit 24 or can be part of a vehicle audio component 64. In either event, microphone 26 and speaker 28 enable vehicle hardware 20 and data center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with data center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to telematics unit 24 via the crash and/or collision detection sensor interface 66 regarding the severity of a vehicle collision, such as the angle of impact and the amount of force sustained.

Vehicle sensors 72, connected to various vehicle sensor modules 44 (VSMs) in the form of electronic hardware components located throughout each fleet vehicle and use the sensed input to perform diagnostic, monitoring, control, reporting and/or other functions. Each of the VSMs 44 is preferably connected by vehicle bus 32 to other VSMs 44, as well as to telematics unit 24, and can be programmed to run vehicle system and subsystem diagnostic tests. As examples, one VSM 44 can be an engine control module (ECM) that controls various aspects of engine operation such as fuel ignition and ignition timing. According to one embodiment, the ECM is equipped with on-board diagnostic (OBD) feature that provides myriad real-time system function data, such as that received from various sensors including vehicle emissions sensors, fuel diagnostics sensors, and vehicle oil pressure sensors as well as provide a standardized series of diagnostic trouble codes (DTCs) which allow a technician to rapidly identify and remedy malfunctions within the vehicle. VSM 44 can similarly be a powertrain control module (PCM) that regulates operation of one or more components of the powertrain system. According to one embodiment, the PCM is equipped with a fuel gauge located in the fuel tank 67 and which provides fuel-level information to indicate the amount of fuel contained in fuel tank 67. Another VSM 44 can be a body control module (BCM) that monitors and governs various electrical components located throughout the vehicle body like the vehicle's power door locks, air conditioner, tire pressure, lighting system, engine ignition, vehicle seat adjustment and heating, mirrors, and headlights. Furthermore, as can be appreciated by skilled artisans, the above-mentioned VSMs are only examples of some of the modules that may be used the vehicles 12, as numerous others are also possible.

A passive entry passive start (PEPS) module, for instance, is another of the numerous of VSMs and provides passive detection of the absence or presence of a passive physical key or a virtual vehicle key. When the passive physical key approaches, the PEPS module can determine if the passive physical key is authentic as belonging to the vehicle. The PEPS can likewise use authentication information received from data center 18 to determine if a mobile computing device 57 with virtual vehicle key is authorized/authentic to vehicle. When the virtual vehicle key is deemed authentic, the PEPS can send a command to BCM 44 permitting access to its vehicle. It should be understood that the PEPS may be an electronic hardware component connected to the vehicle bus 32 or, in an alternative embodiment, may be one or more software code segments uploaded to electronic memory 40.

Wireless carrier system 14 may be a cellular telephone system or any other suitable wireless system that transmits signals between the vehicle hardware 20 and land network 16. According to an example, wireless carrier system 14 includes one or more cell towers 48.

Land network 16 can be a conventional land-based telecommunications network connected to one or more landline telephones, and that connects wireless carrier system 14 to data center 18. For example, land network 16 can include a public switched telephone network (PSTN) and/or an Internet protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

As revealed above, one of the networked devices that can directly or indirectly communicate with the telematics unit 24 is a mobile computing device 57, such as (but not limited to) a smart phone, personal laptop computer or tablet computer having two-way communication capabilities, a wearable computer such as (but not limited to) a smart watch or glasses, or any suitable combinations thereof. The mobile computing device 57 can include computer processing capability, a transceiver 53 capable of communicating with remote locations (e.g., data center 18), digital camera 55, user interface 59, and/or GPS module 63 capable of receiving GPS satellite signals and generating GPS coordinates based on those signals. User interface 59 may be embodied as a touch-screen graphical interface capable of user interaction as well as exhibiting information. Digital camera 55 may include the ability to generate bitmapped data representations of captured tangible-object images through generally known operations. Examples of the mobile computing device 57 include the iPhone™ and Apple Watch™ each being manufactured by Apple, Inc. and the Droid™ smart phone manufactured by Motorola, Inc. as well as others.

Mobile device 57 may be used inside or outside of a vehicle, and may be coupled to the vehicle by wire or wirelessly. Mobile device 57 may also be configured to provide services according to a subscription agreement with a third-party facility or wireless/telephone service provider. It should be appreciated that various service providers may utilize the wireless carrier system 14 and that the service provider of telematics unit 30 may not necessarily be the same as the service provider of mobile device 57.

When using a short-range wireless connection (SRWC) protocol (e.g., Bluetooth Low Energy, Wi-Fi, etc.), mobile computing device 57 and telematics unit 24 may pair with each other (or link to one another) on a case-by-case basis and while within a wireless range; SRWC pairing is known to skilled artisans. The SRWC protocol may be an aspect of telematics unit 24 or may be part of one or more independent VSMs 44 such as the PEPS and/or BCM 44. Once SRWC is established, the devices may be considered bonded (i.e., they may recognize one another and/or connect automatically when they are in a predetermined proximity or range of one other. In other words—they may become, at least temporarily, network participants).

This unique pairing, for example, allows mobile computing device 57 to act as the virtual key fob briefly mentioned above. To illustrate how virtual key fob pairing can occur—upon receiving a request, data center 18 will generate an encrypted virtual vehicle key to permit vehicle access via mobile computing device 57. Data center 18 will then transmit aspects of this encrypted virtual vehicle key information to both mobile computing device 57 and the PEPS module 44 via telematics unit 24. After pairing has been established, mobile computing device 57 will send its virtual vehicle key aspect to telematics unit 24 for recognition in light of its stored corresponding virtual key aspect and in turn the PEPS may establish mobile computing device 57 as the acting key fob for the vehicle. Data center 18 may also transmit one or more time parameters with the encrypted virtual vehicle key information so as to temporarily establish the virtual vehicle key of mobile device 57.

Data center 18 is designed to provide the vehicle hardware 20 with a number of different system backend functions and, according to the example shown here, generally includes one or more switches 52, servers 54, databases 56, advisors 58 as well as a variety of other telecommunication/computer equipment 60. These various data center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. Although the illustrated example has been described as it would be used in conjunction with a manned data center 18, it will be appreciated that the data center 18 can be any central or remote facility, manned or unmanned, mobile or fixed, to or from which it is desirable to exchange voice and data.

Server 54 can incorporate a data controller which essentially controls its operations. Server 54 may control data information as well as act as a transceiver to send and/or receive the data information (i.e., data transmissions) from one or more of the databases 54, telematics unit 24, and mobile computing device 57. The controller is moreover capable of reading executable instructions stored in a non-transitory machine readable medium and may include one or more from among a processor, microprocessor, central processing unit (CPU), graphics processor, Application Specific Integrated Circuits (ASICs), Field-Programmable Gate Arrays (FPGAs), state machines, and a combination of hardware, software, and firmware components.

Database 56 could be designed to store information in the form of executable instructions such as, but not limited to, numerous application program interface (API) suites. Moreover, in certain instances, these API suites may be accessible to the system user, data center 18, or one or more third parties. As examples, one API suite can be a rideshare services suite that incorporates numerous rideshare system records (i.e., vehicle reservation information) each having information related to the vehicles in fleet 12 such as, but not limited to, rideshare vehicle records (e.g., vehicle VSM information), information related to the user such as, but not limited to, reservation account records (e.g., vehicle comfort settings information, telematics unit settings, or vehicle make-model preferences), information related to organizing vehicle reservations such as, but not limited to, reservation profile records (e.g., reservation calendar information, vehicle assignment information, third party contact information, etc.), and information related to fleet management (e.g., fleet vehicle feedback data, localization and mapping data, path planning feedback data, etc.), or any other pertinent rideshare system information. The records can moreover be copied, organized, and/or stored in a tabular form that allows for continuous, real-time updates. The records can additionally collaborate with a reservation account (discussed below) for support of, for example, reservation management.

The user of mobile computing device 57 may create their own personalized vehicle reservation account to be stored in mobile memory 61 and which may have access to the rideshare records at the backend. The user may perform tasks to create this account through a variety of frontend devices such as, for example, through a remote computer and mobile computing device 57. This reservation account may be uploaded to or accessible on server 54 (i.e., to support backend functions). Data center 20 may also access one or more additional remote servers and/or remote databases (e.g., Department of Motor Vehicles, weather databases, traffic databases, etc.) to receive information in support of establishing the reservation account as well as a particular reservation and one or more rideshare system records.

The reservation account may include validating data to verify and/or validate that future login attempts are secure (e.g., granting access only to the user). The validating data may include an account username and account password as well as user information (e.g., driver's license information), mobile computing device information such as, for example, the unique mobile device identifier (i.e., serial number). The user account may additionally store a variety of user preferences.

The user of mobile device 57 may visit an online software application store or web-service and download the reservation account as a software module therefrom. The reservation account may moreover include one or more prompts to instruct the user to provide information (e.g., validating data) to support account creation.

Reservation account may also provide one or more prompts to assist a rideshare system user in reserving a personal transportation fleet vehicle by operatively accessing and communicating with the backend rideshare system records (for the purposes of obtaining transportation to certain destinations). Once a reservation is made, mobile computing device 57 will transmit this reservation information to one or more of the rideshare records for updates thereto. At the backend, server 54 will collaborate with database 56 and one or more of the rideshare system records to establish a subset of the fleet available for reservation.

To illustrate, for example, server 54 can manage the use of a fleet of twenty (20) vehicles in a particular geographic location and determine that ten (10) of those vehicles are available to carry out the requested rideshare reservation. Server 54 will then, for example, select one of those fleet vehicles using a vehicle identifier and assign that identifier to the reservation account and corresponding rideshare records for use during the requested reservation. Server 54 then communicates provided pickup coordinates and drop off coordinates to the selected fleet vehicle via its telematics unit 24 so the vehicle can direct itself to the user, pick the user up, and then drop the user off at a designated location. As vehicles are requested and used, server 54 can determine the identities of the vehicles currently in use and monitor various aspects of the other fleet vehicles so as to understand which vehicles are available at any particular time. This monitoring process may thus be conducted through review of one or more rideshare records.

In another example, when vehicle resources are scarce and time may be a factor, server 54 can determine that the requested reservation includes reservation information that indicates the distance between the pickup coordinates and drop off coordinates is beyond the remaining distance allowed for any one available vehicle. As a result, based on these factors, server 54 will select two of those available fleet vehicles to carry out the requested reservation using a vehicle identifier for both vehicles and assign that identifier to the reservation account and corresponding rideshare records. Server 54 then communicates both the pickup coordinates and coordinates of a rallying location to the telematics unit of one selected fleet vehicle so this first vehicle can direct itself to the user for pickup. Server 54 also communicates the rallying location coordinates and drop off coordinates to the other selected fleet vehicle so this second vehicle can direct itself to the rallying location and wait for the first vehicle to arrive. In this way, the selected vehicles are considered to create a vehicle chain and the user can switch vehicles midway through their reservation. Skilled artists will see that server 54 can select more than two of the available vehicles to work in concert to complete a rideshare reservation. Skilled artists will further see that each vehicle's remaining allowable distance may be determined by the remaining SoC for the power source as indicated by OBD 44 or, in the alternative, may be determined by the remaining fuel as indicated by fuel gauge 44. The rallying location coordinates may moreover be based upon the allowable vehicle distances.

Electric Vehicle Aspects

Figure 2:
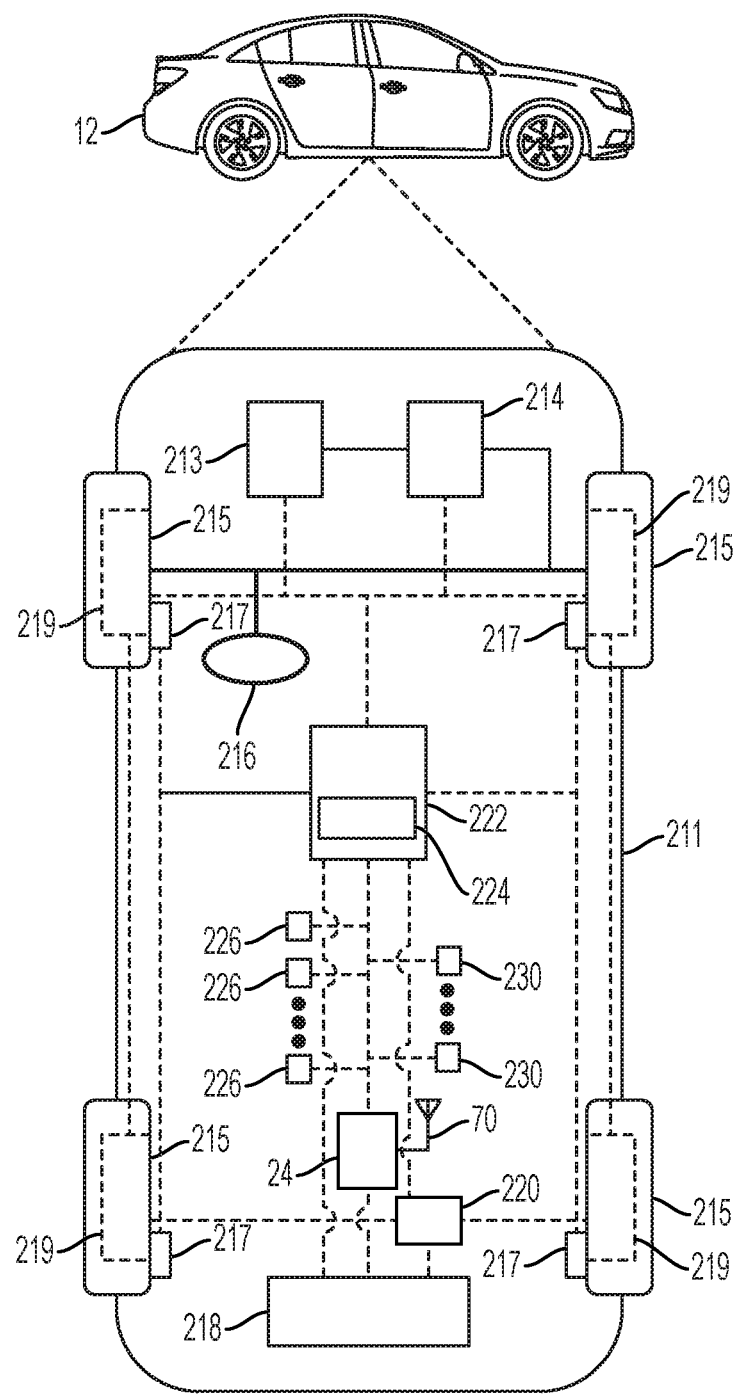
FIG. 2 is a schematic diagram of an autonomously controlled electric vehicle, according to an embodiment of the communications system of FIG. 1.

With reference to FIG. 2, each fleet vehicle 12 can be embodied as an electric vehicle (EV) that generally includes vehicle wheels 215 which rotatably support a vehicle body 211. Fleet vehicle 12 further includes a propulsion system 213 with at least one electric motor 219. An electric motor 219 is operatively connected to each of the vehicle wheels 215 to transmit torque thereto, and thereby propel the fleet vehicle 12. These motors may moreover, in one or more embodiments, be directly or indirectly connected to their corresponding wheel via a transmission 214 (shown as a direct connection configuration). It should be understood that the fleet vehicles may also be embodied as an extended range electric vehicle (EREV) or hybrid vehicle (combining an internal combustion engine with one or more electric motors).

Propulsion system 213 can also include a power source 218 embodied as a battery for the purpose of providing direct-current (DC) electricity to power each of the motors, as well as other vehicle systems. Each motor may be a permanent-magnet motor, induction motor, or any type of motor that uses alternating current (AC) electricity. Consequently, propulsion system 213 can include an inverter aspect 220 operatively connected to the power source output so as to allow the DC current to be converted into AC current before being supplied to the motors. Propulsion system 213 may additionally be connected to a vehicle controls device 222, discussed below, to regulate the amount of transmitted energy from power source 218 so as to effectively control the torque output from each motor 219. Propulsion system 213 may further include an input component, which in some embodiments can be operable by a human (i.e., a selectively depressible foot pedal), to provide for an input of a desired torque output. Propulsion system 213 may moreover be connected to vehicle bus 32 to communicate with one or more VSMs 44 (not shown). For example, OBD 44 may provide State of Charge (SoC) information for power source 218 based on information received from one or more power reading sensors.

While depicted as a single unit for illustrative purposes, vehicle controls device 222 may additionally include one or more other controllers, collectively referred to as a "controls device" or "vehicle controls device." Controls device 222 may include a microprocessor such as a central processing unit (CPU) or graphics processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controls device 222 in controlling the vehicle.

Autonomous Vehicle Aspects

In addition to the fleet vehicle aspects discussed above, transmission 214 may be installed to transmit power from propulsion system 213 to vehicle wheels 215 according to selectable speed ratios. According to various embodiments, transmission 214 may include a step-ratio automatic transmission, a continuously-variable transmission, or other appropriate transmission. Fleet vehicle 12 additionally includes wheel brakes 217 configured to provide braking torque to the vehicle wheels 215. The wheel brakes 217 may, in various embodiments, include friction brakes, a regenerative braking system such as an electric machine, and/or other appropriate braking systems. It should be understood transmission 214 does not necessarily need to be installed for propulsion system 213 to propel fleet vehicle 12.

Each fleet vehicle 12 additionally includes a steering system 216. While depicted as including a steering wheel for illustrative purposes, in some contemplated embodiments, the steering system 16 may not include a steering wheel. Telematics unit 24 is additionally configured to wirelessly communicate with other vehicles ("V2V") and/or infrastructure ("V2I") and/or pedestrians ("V2P"). These communications may collectively be referred to as a vehicle-to-entity communication ("V2X"). In an exemplary embodiment, this communication system communicates via at least one dedicated short-range communications (DSRC) channel. DSRC channels refer to one-way or two-way short-range to medium-range wireless communication channels specifically designed for automotive use and a corresponding set of protocols and standards.

The propulsion system 213 (explained above), transmission 214, steering system 216, and wheel brakes 217 are in communication with or under controls device 222. Vehicle controls device 222 includes an automated driving system (ADS) 224 for automatically controlling various actuators in the vehicle. In an exemplary embodiment, ADS 224 is a so-called Level Four or Level Five automation system. A Level Four system indicates "high automation", referring to the driving mode-specific performance by an automated driving system of all aspects of the dynamic driving task, even if a human driver does not respond appropriately to a request to intervene. A Level Five system indicates "full automation", referring to the full-time performance by an automated driving system of all aspects of the dynamic driving task under all roadway and environmental conditions that can be managed by a human driver. In an exemplary embodiment, the ADS 224 is configured to communicate automated driving information with and control propulsion system 213, transmission 214, motors 219, steering system 216, and wheel brakes 217 to control vehicle acceleration, steering, and braking, respectively, without human intervention via a plurality of actuators 30 in response to inputs from a plurality of driving sensors 226, which may include GPS, RADAR, LIDAR, optical cameras, thermal cameras, ultrasonic sensors, and/or additional sensors as appropriate.

Figure 3:
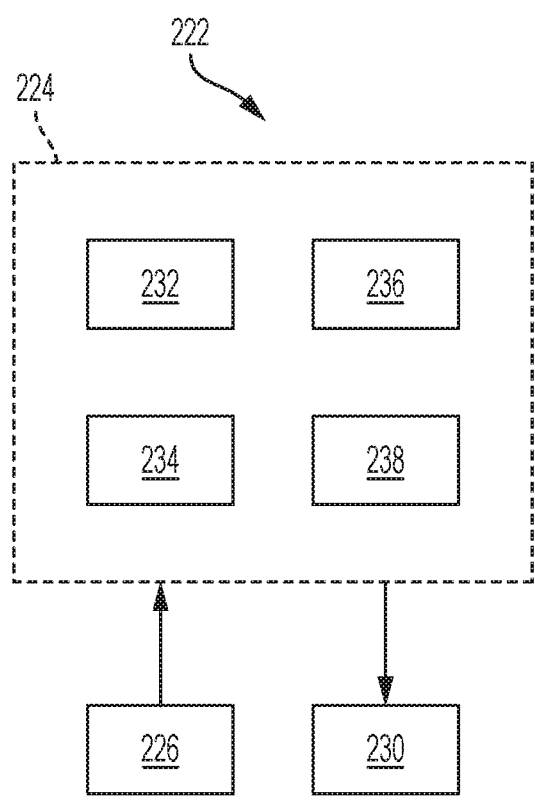
FIG. 3 is a schematic block diagram of an exemplary automated driving system (ADS) for the vehicle of FIG. 2.

In various embodiments, the instructions of the ADS 224 may be organized by function or system. For example, as shown in FIG. 3, ADS 224 can include a sensor fusion system 232 (computer vision system), a positioning system 234, a guidance system 236, and a vehicle control system 238. As can be appreciated, in various embodiments, the instructions may be organized into any number of systems (e.g., combined, further partitioned, etc.) as the disclosure is not limited to the present examples.

In various embodiments, the sensor fusion system 232 synthesizes and processes sensor data and predicts the presence, location, classification, and/or path of objects and features of the environment of the vehicle 12. In various embodiments, the sensor fusion system 232 can incorporate information from multiple sensors, including but not limited to cameras, lidars, radars, and/or any number of other types of sensors. In one or more exemplary embodiments described herein, the sensor fusion system 232 supports or otherwise performs the ground reference determination processes and correlates image data to lidar point cloud data, the vehicle reference frame, or some other reference coordinate frame using calibrated conversion parameter values associated with the pairing of the respective camera and reference frame to relate lidar points to pixel locations, assign depths to the image data, identify objects in one or more of the image data and the lidar data, or otherwise synthesize associated image data and lidar data. In other words, the sensor output from the sensor fusion system 232 provided to the vehicle control system 238 (e.g., indicia of detected objects and/or their locations relative to the vehicle 10) reflects or is otherwise influenced by the calibrations and associations between camera images, lidar point cloud data, and the like.

The positioning system 234 processes sensor data along with other data to determine a position (e.g., a local position relative to a map, an exact position relative to lane of a road, vehicle heading, velocity, etc.) of the vehicle 12 relative to the environment. The guidance system 236 processes sensor data along with other data to determine a path for the vehicle 12 to follow (i.e., path planning data). The vehicle control system 238 generates control signals for controlling the vehicle 12 according to the determined path.

In various embodiments, the vehicle controls device 222 implements machine learning techniques to assist the functionality of the vehicle controls device 222, such as feature detection/classification, obstruction mitigation, route traversal, mapping, sensor integration, ground-truth determination, and the like.

The output of vehicle controls device 222 is communicated to actuators 230. In an exemplary embodiment, the actuators 230 include a steering control, a shifter control, a throttle control, and a brake control. The steering control may, for example, control a steering system 216 as illustrated in FIG. 2. The shifter control may, for example, control a transmission 214 as illustrated in FIG. 2. The throttle control may, for example, control a propulsion system 213 as illustrated in FIG. 2. The brake control may, for example, control wheel brakes 217 as illustrated in FIG. 2.

Method

As explained above, at least partially, rideshare systems are those systems which allows a user (rideshare system user) to download a reservation account to a mobile computing device and then register their account by providing personal and/or payment information. The user may then have access to a rideshare system to request personal transportation from an available autonomous vehicle (discussed above), generally within a certain proximity of their location or a selected location (e.g., 5-10 miles) and able to meet desired reservation time restrictions. During the rideshare reservation, a delegated vehicle will autonomously traverse to the user's location, pick the user up, autonomously transport the user to their selected destination to drop the user off before their deadline. Afterwards, the user may be provided an opportunity to submit their own feedback/rating of one or more of the rideshare system services. The vehicle may moreover autonomously traverse to the next request, a parking location, or a vehicle charge station or refueling station.

Nevertheless, a user may request transportation which, if carried out as discussed in the preceding paragraph, would exceed the allowable vehicle resources of any available vehicle. Moreover, there may not be enough time for any one of the available vehicles to replenish resources before the reservation's established time limit. Under such circumstances, the rideshare system can delegate one vehicle to autonomously traverse to the user's location, pick the user up, and transport the user to a rallying point. A second system delegated vehicle can then pick the user up at this rallying point and transport the user to the selected destination location before the reservation deadline.

Figure 4:
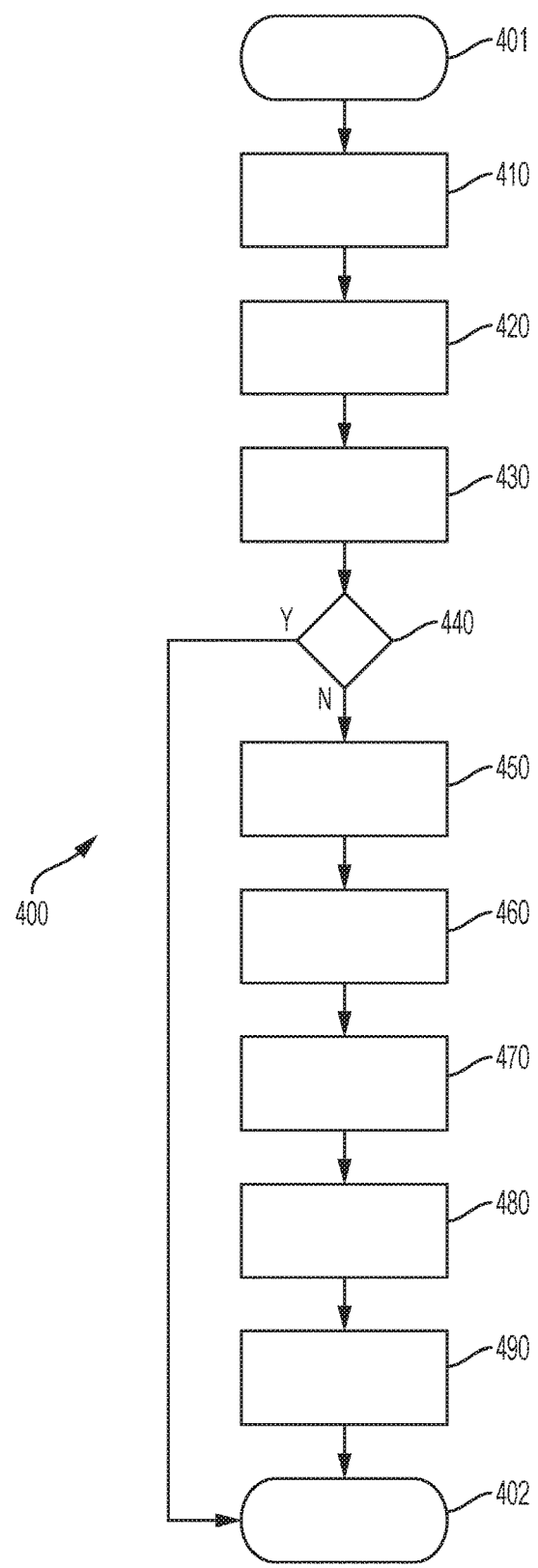
FIG. 4 represents a flow chart for an exemplary methodology for vehicle chaining as disclosed herein.

Turning now to FIG. 4, to detail the circumstances above, there can be seen an application of a method to produce instruction sets for at least two delegated fleet vehicles so as to work in concert to complete a rideshare reservation. Aspects of this method may be executed through server 54, for example, implementing the backend functionality stored on database 56. Peripheral aspects may be executed through controls device 222 of each delegated fleet vehicle 12, for example, to implement the generated instructions and cause the fleet vehicle to properly traverse the generated route presented in their respective instruction set.

Upon initiation 401, a user will be prompted to provide their desired user pickup location as well as their desired drop off destination location via their reservation account, for example, on their mobile device 57. The user location may be the GPS coordinates of mobile computing device 57 or this location may be designated by the user through one or more reservation account prompts. The user may also be prompted to provide a specified time parameter which establishes the reservation deadline. For example, the user may communicate to their reservation account they desire to be picked up at their current location and dropped off at some distant location (e.g., their home located 10 miles away). The user may also communicate that they would like to be dropped off at this distant location within an hour.

In step 410, the reservation process begins, at least in part, when server 54 receives the user location data from the remotely located mobile computing device 57. Server 54 will then determine the user location corresponding to this data and filter and format these coordinates in a suitable form. This may be done via, for example when the user location data are embodied as GPS coordinates, a known location interface module stored in databases 56. This may otherwise be done via, for example when the user location data is designated by the user via the reservation account, a known map data module stored in databases 56. In this step, optionally, server may also receive time parameter data corresponding to the user location data. For example, the time parameter data of this step may establish the delegated fleet vehicle is to be at the user location no later than fifteen (15) minutes from the reservation being established.

In step 420, server 54 will similarly receive the destination location data from the remotely located mobile computing device 57. Server 54 will then determine the destination location corresponding to this data and filter and format these coordinates in a suitable form. This may be done via, for example, the map data module. In this step, optionally, server 54 may also receive time parameter data corresponding to the destination location data. For example, the time parameter data may establish the delegated fleet vehicle is to be at the destination location no later than one (1) hour from departing the user location.

In step 430, server 54 will conduct a census of any/all fleet vehicles last known to be within a certain proximity of the designated user location. For example, server 54 may request and receive GPS data from the available fleet vehicles last known to be within five (5) miles from the user location. Upon census completion, server 54 will determine the vehicle location coordinates for each of these fleet vehicles.

In step 440, server 54 will request and receive the system function data for the vehicles determined within proximity of the user location coordinates. When the fleet vehicles are embodied as electric vehicles, discussed above, incorporating numerous electric motors, the system function data can be State of Charge information sensed from the vehicle's on-board diagnostic feature (OBD) 44. When the fleet vehicles incorporate a propulsion system with an internal combustion engine, on the other hand, the system function data can be fuel-level information sensed from the vehicle's fuel gauge 44.

In this step, furthermore, server 54 will determine if any of these vehicles have/will have enough resources (i.e., State of Charge/fuel) to safely carryout the reservation as requested (i.e., carryout the reservation tasks and still have enough remaining resources to arrive at a charge/fuel station). If one or more of the fleet vehicles is able to carryout the reservation, one of those vehicles will be delegated to carryout the reservation and method 400 will move to completion 402. However, if it is determined that none of the vehicles have/will have enough resources, method 400 will move to step 450.

Figure 5:
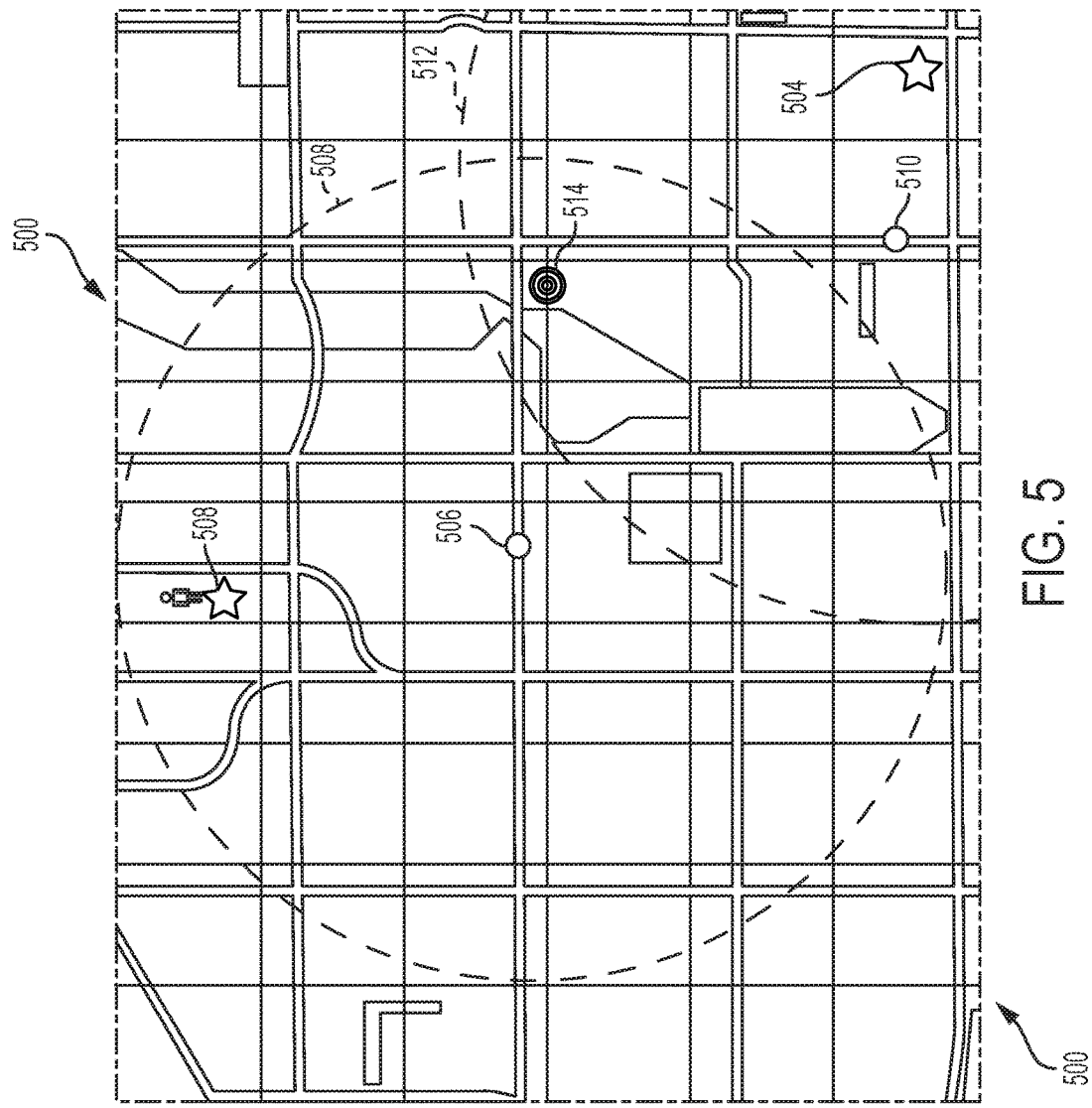
FIG. 5 represents an exemplary map illustrating aspects of the system and method disclosed herein.
Figure 6:
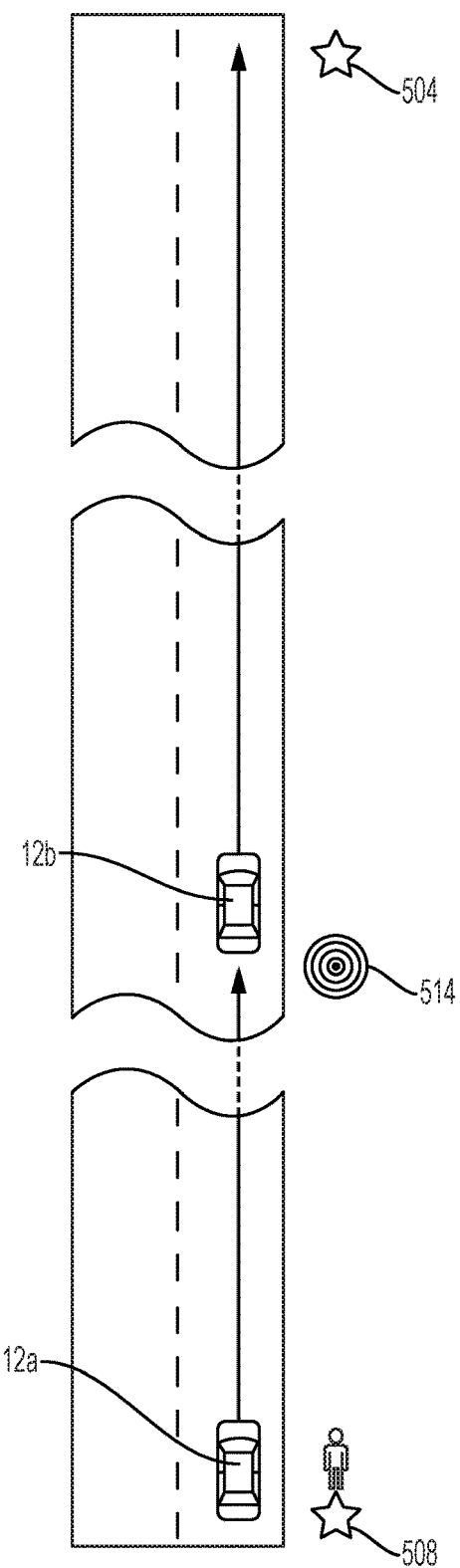
FIG. 6 further represents exemplary aspects of the method and system disclosed herein.

In step 450, with reference to FIGS. 5 and 6, server 54 will review and analyze the system function data of each vehicle in light of their respective vehicle locations 506 and 510, the user location 502, and the destination location 504. Thereafter, server 54 will select at least two vehicles based on these factors. For instance, the fleet vehicle at vehicle location 506 has an estimated travel range 508 which can only allow the vehicle to get part way to the destination location 504 after getting the user at their user location 508. Conversely, the fleet vehicle at vehicle location 510 has an estimated travel range 512 which does not allow the vehicle to reach the user location 508 but allows the vehicle to reach destination location 504. Therefore, server 54 may select the vehicles at location 506 and the vehicle at location 510 because each is unable to carry out the reservation by themselves but can carry out the entire reservation when working in concert. Factoring into account the remaining vehicle resources, server 54 will also create a rallying location 514 located somewhere between the two vehicle locations 506 and 510. The rallying point location 514 acts as a midway point in which the selected vehicles are to meet (i.e., to establish a vehicle chain).

In step 460, server 54 will produce a set of instructions (i.e., output data) formatted to instruct the vehicle controls device 222 of first vehicle 12a to command the vehicle to traverse from its respective vehicle location 506 to the user location 508. Upon user pickup, the instructions will instruct vehicle controls device 222 to command the first vehicle 12a to traverse to rallying point 514. In step 470, server 54 will communicate these instructions as a first output to the first vehicle 12a to be received by vehicle controls device 222.

In step 480, likewise, server 54 will produce a set of instructions formatted to instruct the vehicle controls device 222 of the second vehicle 12b to command the vehicle to traverse from its respective vehicle location 510 to rallying point 514 to wait for the first vehicle 12a. Upon arrival, the instructions will instruct vehicle controls device 222 to command the second vehicle 12b to take the user from rallying point 514 to destination location 504. In step 490, server 54 will communicate these instructions as a second output to the second vehicle 12b to be received by the corresponding vehicle controls device 222. Once both outputs, the first and second output, have been adequately communicated, method 400 will move to completion 402.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A system to provide instructions to establish a vehicle chain, the system comprises:
   a memory configured to comprise one or more executable instructions;
   a controller configured to execute the executable instructions, the controller further configured to receive user location data and destination location data communicated from a mobile computing device;
   a plurality of fleet vehicles each of which is configured to communicate with the controller and each of which comprises a first vehicle system, a second vehicle system, and a vehicle controls device;
   wherein the first vehicle system is configured to generate vehicle location data, wherein the second vehicle system is configured to generate system function data, and wherein the vehicle controls device is configured to command the fleet vehicle to autonomously complete one or more rideshare reservations; and
   wherein the executable instructions enable the controller to:
      receive the user location data communicated from the mobile computing device;
      receive the destination location data communicated from the mobile computing device;
      receive the respective vehicle location data communicated from each fleet vehicle of the plurality of fleet vehicles;
      receive the respective system function data communicated from each fleet vehicle of the plurality of fleet vehicles;
      select at least two fleet vehicles from the plurality of fleet vehicles, wherein each selection is based, at least in part, on the vehicle location data and system function data of the respective fleet vehicle in relation to the user location data, wherein the at least two selected fleet vehicles are considered a first-selected vehicle and a second-selected vehicle;
      produce first output data configured to instruct the vehicle controls device of the first-selected vehicle to command the first-selected vehicle to traverse from a vehicle location which corresponds to the respective vehicle location data to a user location which corresponds to the user location data, the first output is further configured to command the first-selected vehicle to subsequently traverse from the user location to a rallying location;
      produce second output data configured to instruct the vehicle controls device of the second-selected vehicle to command the second-selected vehicle to traverse from a vehicle location which corresponds to the respective vehicle location data to the rallying location, the second output is further configured to command the second-selected vehicle to subsequently traverse from the rallying location to a destination location which corresponds to the destination location data;
      communicate the first output data to the first-selected vehicle, wherein, when the first output data is received at the first-selected vehicle, the first-selected vehicle will traverse from the vehicle location which corresponds to the respective vehicle location data to the user location and the first-selected vehicle will subsequently traverse from the user location to the rallying location; and
      communicate the second output data to the second-selected vehicle, wherein, when the second output data is received at the second-selected vehicle, the second-selected vehicle will traverse from the vehicle location which corresponds to the respective vehicle location data to the rallying location and the second-selected vehicle will subsequently traverse from the rallying location to the destination location.

2. The system of claim 1, wherein the executable instructions further enable the controller to select the rallying location based, at least in part, on the respective vehicle location data and respective system function data of the at least two selected fleet vehicles.

3. The system of claim 1, wherein each fleet vehicle in the plurality of fleet vehicles comprises a propulsion system having at least one electric motor operatively connected to each of the vehicle wheels.

4. The system of claim 3, wherein the second vehicle system is an on-board diagnostic feature and the system function data comprises State of Charge information.

5. The system of claim 1, wherein each fleet vehicle in the plurality of fleet vehicles comprises a propulsion system having at least one internal combustion engine.

6. The system of claim 4, wherein the second vehicle system is a fuel gauge and the system function data comprises fuel-level information.

7. The system of claim 1, wherein:
   the mobile computing device is further configured to generate time parameter data and is further configured to communicate the time parameter data to the controller; and
   wherein the selection of the at least two fleet vehicles from the plurality of fleet vehicles is further based, at least in part, on the time parameter data.

8. A method to provide instructions to establish a vehicle chain, the method comprising:
   providing a memory configured to comprise one or more executable instructions;
   providing a controller configured to execute the executable instructions, the controller further configured to receive user location data and destination location data communicated from a mobile computing device;
   providing a plurality of fleet vehicles each of which is configured to communicate with the controller and each of which comprises a first vehicle system, a second vehicle system, and a vehicle controls device, wherein the first vehicle system is configured to generate vehicle location data, wherein the second vehicle system is configured to generate system function data, and wherein the vehicle controls device is configured to command the fleet vehicle to autonomously complete one or more rideshare reservations;

receiving, via the controller, the user location data communicated from the mobile computing device;

receiving, via the controller, the destination location data communicated from the mobile computing device;

receiving, via the controller, the respective vehicle location data communicated from each fleet vehicle of the plurality of fleet vehicles;

receiving, via the controller, the respective system function data communicated from each fleet vehicle of the plurality of fleet vehicles;

selecting, via the controller, at least two fleet vehicles from the plurality of fleet vehicles, wherein each selection is based, at least in part, on the vehicle location data and system function data of the respective fleet vehicle in relation to the user location data, wherein the at least two selected fleet vehicles are considered a first-selected vehicle and a second-selected vehicle;

producing, via the controller, first output data configured to instruct the vehicle controls device of the first-selected vehicle to command the first-selected vehicle to traverse from a vehicle location which corresponds to the respective vehicle location data to a user location which corresponds to the user location data, the first output is further configured to command the first-selected vehicle to subsequently traverse from the user location to a rallying location;

producing, via the controller, second output data configured to instruct the vehicle controls device of the second-selected vehicle to command the second-selected vehicle to traverse from a vehicle location which corresponds to the respective vehicle location data to the rallying location, the second output is further configured to command the second-selected vehicle to subsequently traverse from the rallying location to a destination location which corresponds to the destination location data;

communicating, via the controller, the first output data to the first-selected vehicle, wherein, when the first output data is received at the first-selected vehicle, the first-selected vehicle will traverse from the vehicle location which corresponds to the respective vehicle location data to the user location and the first-selected vehicle will subsequently traverse from the user location to the rallying location; and communicating, via the controller, the second output data to the second-selected vehicle, wherein, when the second output data is received at the second-selected vehicle, the second-selected vehicle will traverse from the vehicle location which corresponds to the respective vehicle location data to the rallying location and the second-selected vehicle will subsequently traverse from the rallying location to the destination location.

9. The method of claim 8, further comprising selecting, via the controller, the rallying location based, at least in part, on the respective vehicle location data and respective system function data of the at least two selected fleet vehicles.

10. The method of claim 8, wherein each fleet vehicle in the plurality of fleet vehicles comprises a propulsion system having at least one electric motor operatively connected to each of the vehicle wheels.

11. The method of claim 10, wherein the second vehicle system is an on-board diagnostic feature and the system function data comprises State of Charge information.

12. The method of claim 8, wherein each fleet vehicle in the plurality of fleet vehicles comprises a propulsion system having at least one internal combustion engine.

13. The method of claim 12, wherein the second vehicle system is a fuel gauge and the system function data comprises fuel-level information.

14. The method of claim 8, further comprising:
wherein the mobile computing device is further configured to generate time parameter data and further configured to communicate the time parameter data to the controller; and
wherein the step of: selecting, via the controller, the at least two fleet vehicles from the plurality of fleet vehicles is further based, at least in part, on the time parameter data.

15. A non-transitory and machine-readable medium having stored thereon executable instructions adapted to produce instruction sets for at least two fleet vehicles such that the at least two fleet vehicles establish a vehicle chain for the completion of a rideshare reservation, which when provided to a controller and executed thereby, causes the controller to:
receive user location data communicated from a mobile computing device;
receive destination location data communicated from the mobile computing device;
receive respective vehicle location data communicated from each fleet vehicle of a plurality of fleet vehicles;
receive respective system function data communicated from each fleet vehicle of the plurality of fleet vehicles;
select at least two fleet vehicles from the plurality of fleet vehicles, wherein each selection is based, at least in part, on the vehicle location data and system function data of the respective fleet vehicle in relation to the user location data, wherein the at least two selected fleet vehicles are considered a first-selected vehicle and a second-selected vehicle;
produce first output data configured to instruct the vehicle controls device of the first-selected vehicle to command the first-selected vehicle to traverse from a vehicle location which corresponds to the respective vehicle location data to a user location which corresponds to the user location data, the first output is further configured to command the first-selected vehicle to subsequently traverse from the user location to a rallying location;
produce second output data configured to instruct the vehicle controls device of the second-selected vehicle to command the second-selected vehicle to traverse from a vehicle location which corresponds to the respective vehicle location data to the rallying location, the second output is further configured to command the second-selected vehicle to subsequently traverse from the rallying location to a destination location which corresponds to the destination location data;
communicate the first output data to the first-selected vehicle, wherein, when the first output data is received at the first-selected vehicle, the first-selected vehicle will traverse from the vehicle location which corresponds to the respective vehicle location data to the user location and the first-selected vehicle will subsequently traverse from the user location to the rallying location; and
communicate the second output data to the second-selected vehicle, wherein, when the second output data is received at the second-selected vehicle, the second-selected vehicle will traverse from the vehicle location which corresponds to the respective vehicle location data to the rallying location and the second-selected vehicle will subsequently traverse from the rallying location to the destination location.

16. The non-transitory and machine-readable memory of claim 15, further comprises select the rallying location based, at least in part, on the respective vehicle location data and respective system function data of the at least two selected fleet vehicles.

17. The non-transitory and machine-readable memory of claim 15, further comprises:
   receive time parameter data communicated from the mobile computing device; and
   wherein selection of the at least two fleet vehicles from the plurality of fleet vehicles is further based, at least in part, on the time parameter data.

18. The non-transitory and machine-readable memory of claim 15, wherein each fleet vehicle in the plurality of fleet vehicles comprises a propulsion system having at least one electric motor operatively connected to each of the vehicle wheels.

19. The non-transitory and machine-readable memory of claim 18, wherein the second vehicle system is an on-board diagnostic feature and the system function data comprises State of Charge information.

20. The non-transitory and machine-readable memory of claim 15, wherein the second vehicle system is a fuel gauge and the system function data comprises fuel-level information.

* * * * *